(No Model.)

G. NICOLESCU.
COMBINED TRY SQUARE, SURFACE GAGE, AND LEVEL.

No. 369,547. Patented Sept. 6, 1887.

Witnesses,
Geo. H. Strong.

Inventor,
Geo. Nicolescu
By Dewey & Co.
attys

UNITED STATES PATENT OFFICE.

GEORGE NICOLESCU, OF SAN FRANCISCO, CALIFORNIA.

COMBINED TRY-SQUARE, SURFACE-GAGE, AND LEVEL.

SPECIFICATION forming part of Letters Patent No. 369,547, dated September 6, 1887.

Application filed May 28, 1887. Serial No. 239,710. (No model.)

*To all whom it may concern:*

Be it known that I, GEORGE NICOLESCU, of the city and county of San Francisco, State of California, have invented an Improvement in Try-Square, Surface-Gage, Level, and Plumb; and I hereby declare the following to be a full, clear, and exact description of the same.

My invention relates to a mechanic's tool; and it consists of combination of try-square, level, surface-gage, and plumb in one device, which will be more fully explained by reference to the accompanying drawings, in which—

Figure 1:
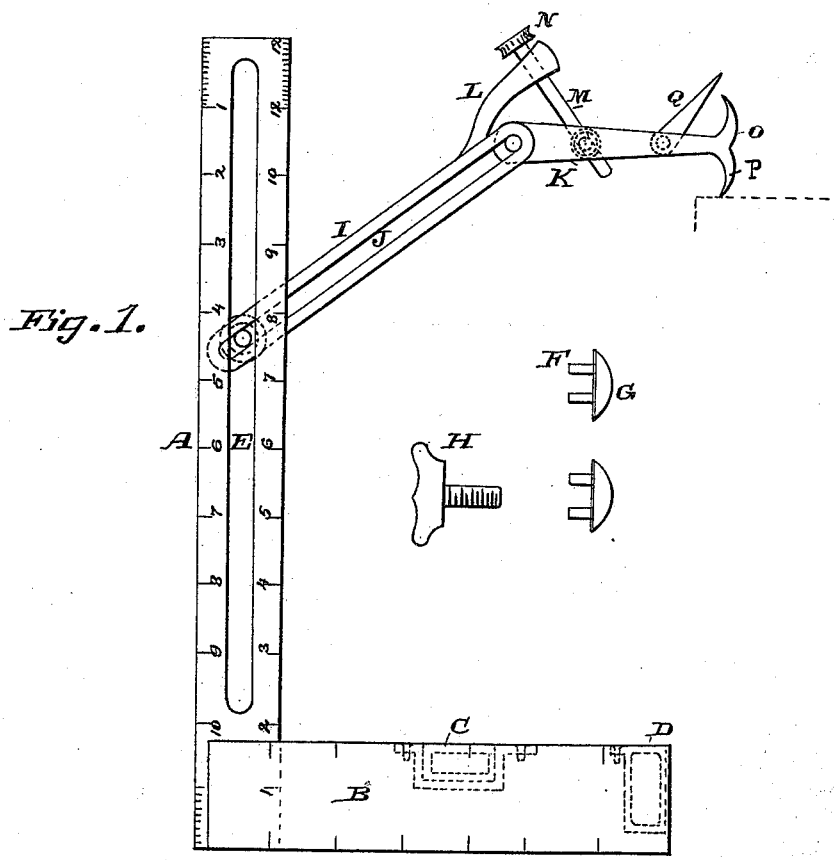
Figure 2:
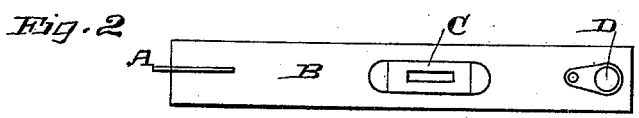
Figure 3:
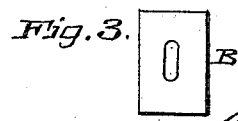

Figure 1 is a side elevation of the apparatus. Fig. 2 is a top view showing a level. Fig. 3 is an end view showing the plumb.

A and B are the two arms of the try-square, which are preferably made of steel, and are marked or engraved in any suitable or desired divisions or scales to suit the work to which they are to be applied. In the short arm B is a level, C, fitted into its upper surface, so that by resting it upon any surface it may be easily seen whether it is level or not, and in the end of this arm is fitted another glass gage, by which it may be ascertained whether a vertical wall is perfectly plumb or not by resting the side of the portion B against this wall.

The long arm A of the try-square has a slot made in its center extending from end to end, as shown at E, and in this slot is fitted a pin, F, which is made wide enough to just fit the slot and of such length that it will not turn in the slot. This pin has a head, G, and it is made hollow and is screw-threaded to receive the screw-threaded end of a thumb-nut, H, which enters it. The head G being upon one side of the blade A and the nut H upon the other side, they will serve to clamp the arm or extension I firmly upon the arm A at whatever angle it may be desired to set it, the pin passing through a slot, J, in this arm also.

At the center end of the arm I is secured another arm, K, which is adjusted about a fulcrum-pin, and which may be secured at any desired point or angle by means of a thumb nut or screw passing through the two parts. From the upper end of the arm I a fixed supplemental arm, L, extends, and a screw, M, passes through this and through a swivel-nut upon the arm K. The screw M has a milled head, by which it may be turned, and after the arm I has been secured to the arm A the arm K may be adjusted up or down by means of the screw M, before described.

At the outer end of the arm K are two points, O and P, one projecting upward and the other downward, and when it is desired to ascertain the height or to gage a surface from above the point P will be adjusted to that surface, while the arm B of the square rests upon a suitable support with reference to the surface to be gaged. Any slight movement up or down for the purpose of this adjustment will be made, as before described, by the screw M. If it is desired to gage a surface from below, the point O will be adjusted to this surface in the same manner.

Q is a movable arm pivoted to the outer end of the arm K, and having a point at its end, and it may be set by an adjustable thumb-nut as a scriber to mark any surface or points thereon, so as to indicate an equal height of any two or more points.

The whole device forms a convenient and handy tool for a workman, and is suitable for a great many purposes.

Having thus described my invention, what I claim as new, and desire to secure by Letters Patent, is—

1. The arm B, having the levels fixed to it, as shown, and the longitudinally-slotted arm A, extending at right angles from the arm B, in combination with the slotted arm I, the adjusting and locking screw by which it is secured to the arm A, the surface-gage extension-arm K, and the adjusting-screw M, substantially as described.

2. The try-square having the levels, the slotted arm, and the supplemental extension adjustably secured thereto, in combination with the extension-arm K, hinged to its outer end and having the surface-gages O and P, and the scriber Q, together with the adjusting-screw, substantially as herein described.

In witness whereof I have hereunto set my hand.

GEORGE NICOLESCU.

Witnesses:
A. M. HENKEL,
CHRIS VON STADEN.